(12) United States Patent
Geddes

(10) Patent No.: US 6,978,727 B2
(45) Date of Patent: Dec. 27, 2005

(54) SOIL CONTROL MECHANISM

(76) Inventor: Ian Geddes, P.O. Box 82, Lake Bolac, Victoria 3351 (AU)

(*) Notice: Subject to any disclaimer, the term of this patent is extended or adjusted under 35 U.S.C. 154(b) by 0 days.

(21) Appl. No.: 10/480,797

(22) PCT Filed: Jun. 21, 2002

(86) PCT No.: PCT/AU02/00810

§ 371 (c)(1),
(2), (4) Date: Jul. 6, 2004

(87) PCT Pub. No.: WO03/000031

PCT Pub. Date: Jan. 3, 2003

(65) Prior Publication Data

US 2004/0237863 A1    Dec. 2, 2004

(30) Foreign Application Priority Data

Jun. 22, 2001   (AU) ...................... PR5868

(51) Int. Cl.$^7$ .............................................. A01C 5/06
(52) U.S. Cl. ...................... 111/167; 111/194
(58) Field of Search ................ 111/158, 163, 167, 111/189–192, 194, 139, 140; 172/558–565, 172/139–142

(56) References Cited

U.S. PATENT DOCUMENTS

| 4,422,392 A | 12/1983 | Dreyer et al. ............... 111/52 |
| 4,760,806 A | 8/1988 | Bigbee et al. ............... 111/87 |
| 5,626,196 A | 5/1997 | Hughes ..................... 172/558 |
| 5,802,995 A | 9/1998 | Baugher et al. ............ 111/52 |

FOREIGN PATENT DOCUMENTS

AU    1188883    2/1985

*Primary Examiner*—Christopher J. Novosad
(74) *Attorney, Agent, or Firm*—Dennison, Schultz, Dougherty & MacDonald

(57) ABSTRACT

A ground engaging seed delivery device comprising an elongate support arm 8 pivotally mounted to a driving structure via a mounting structure 7 adapted to accommodate vertical linear displacement wherein the support arm has an offset coulter disc 3 fitted along the length thereof, a back swept seed delivery tube 2, followed by a packer wheel 4 and a ground engaging control arm 1 positioned to act between the coulter disc and packer wheel so as to follow a furrow formed by the coulter disc and prevent the furrow divot from either collapsing and/or being thrown prior to delivery of seed into the furrow such that the packer wheel can replace the divot immediately following delivery of seed to the furrow.

11 Claims, 2 Drawing Sheets

SOIL CONTROL MECHANISM

This invention relates to soil working machinery and in particular to a high performance ground engaging seed delivery mechanism applicable to a wide range of agricultural situations.

BACKGROUND TO THE INVENTION

The success or failure of seeding operations depends on a combination of environmental and practice factors including a sound choice of seeding location, seeding timing and soil preparation. In addition to the above obvious factors a substantial contribution to the likely success of seeding operations is governed by the precision and accuracy with which seed is deposited in the ground. These factors have to date been limited by the availability of precision seeding devices including the limited ability of current technology to provide for sowing at an accurate and precise depth over a range of terrain. A further limitation of current technology involves the careful control of soil during furrow formation and during seed deposition through to closing of the furrow after the seed has been deposited.

To date the generic form of seeding device includes a pivoted arm onto which is located a coulter disc for forming a furrow followed by a packer wheel which doubles as a height adjustment means. The primitive form of the currently available mechanisms results in the arcuate movement of the coulter and packer wheel which causes inaccuracies of seeding depth as the mechanism traverses undulations in the soil or earth surface.

In order to overcome these inaccuracies, improved seeding devices have been developed which incorporate mounting means adapted for accurate vertical travel of seeding mechanism by way of a parallel hinged bracket such that vertical movement of the coulter disc and packer wheel faithfully follow undulations in the soil and maintain an accuracy of seeding depth notwithstanding variations in the soil contour.

Such mechanisms provide vastly Improved seeding performance over the existing prior art. However, limitations still exist with respect to the actual formation of the furrow which often fails due to collapse, unwanted displacement and undesirable compaction during seed placement. Accordingly such seeding devices can be further Improved with the provision of additional mechanisms to improve the accuracy of furrow preparation immediately prior to seed deposition and subsequent packing following seed deposition.

STATEMENT OF INVENTION

Accordingly in one aspect the invention provides a ground engaging seed delivery device comprising an elongate support arm pivotally mounted to a driving means via a mounting means adapted to accommodate vertical linear displacement wherein said support arm has an offset coulter disc fitted at a first end thereof followed by a back swept seed delivery tube and a packer wheel at the remote end thereof adapted to follow a soil contour such that said support arm will also follow said soil contour wherein a soil control arm comprising an elongate arm and a ground engaging foot is positioned on said support arm to act between said coulter disc and packer wheel with at least part of said foot engaging the soil between said coulter disc and said packer wheel adjacent said seed delivery tube so that said soil control arm will follow a furrow formed by said coulter disc and prevent said furrow divot from either collapsing and/or being thrown prior to delivery of seed into said furrow between said coulter disc and said packer wheel such that said packer wheel can replace said divot immediately following delivery of seed to said furrow whilst allowing said soil control arm to maintain a constant presentation to said soil notwithstanding changes In soil contour.

The control arm may include a foot region adapted to engage the ground soil surface adjacent the furrow from about the position of formation of the furrow by the coulter disc to at least the position of seed delivery.

The control arm is most preferably biased in a downward vertical direction by way of a spring or other biasing means to ensure constant engagement of the ground by the control arm.

The seed delivery tube may include one or two side skirts either side of the tube per se, wherein the sloe skirt cooperates with the foot of the control arm to prevent said furrow divot from either collapsing and/or being thrown.

The mounting means for She delivery device may take the form of a parallel motion swinging bracket such that the ground cooperating aspect of the coulter disc in combination with the control arm seed delivery means and packer wheel remain substantially maintained throughout any vertical displacement occurring by way of irregularities in the ground level. The swinging bracket may also be biased in downward vertical direction such that in combination with the weight of the device per se the device remains in faithful contact with the ground during travel.

The elongate support arm of the device may be provided with a preloading bias in the form of a biasing spring means so as to ensure substantially constant ground engagement of the coulter and packer wheels whilst allowing optional pivotal rotation to accommodate stump jumping or the traversal of other obstructions encountered during operation.

The various biasing means incorporated in the delivery device may be configured such that the preload bias of the support arm is greater than the bias provided for the control arm or the bias provided for said swinging bracket. In this manner the benefits of the precision orientation provided by the parallelogram configured mounting means is fully utilised and only as a last resort is the preloading bias activated with respect to the support arm in order to avoid damage to any of the other mechanisms which might occur during stump jumping.

The packer wheel of the delivery device may be trackably adjustable to enable the packer wheel to run in a position other than direction of travel of the delivery device. Moreover the packer wheel may be adjustable vertically to determine the depth of the furrow cut and seed delivery.

The mounting means by which the delivery device is attached to the driving means may incorporate a spring steel bar in the form of an intermediate dropper to which the support arm of the device is attached.

The invention will now be described in more detail with reference to FIGS. 1 and 2 where one particular embodiment of the invention is shown for exemplification only.

DETAILED DESCRIPTION OF THE INVENTION

Figure 1:
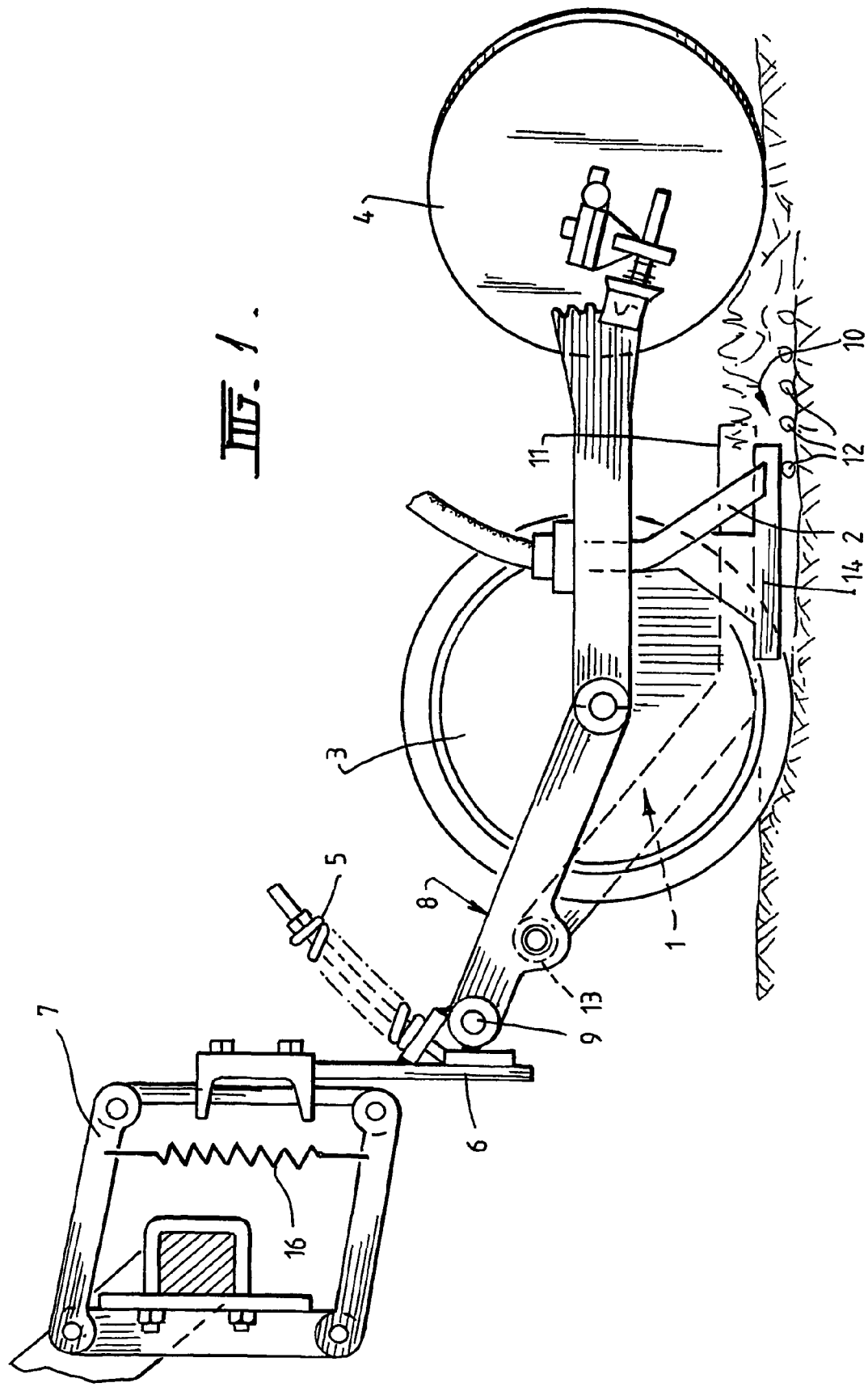
FIG. 1 shows a side view of one seed delivery device of the invention.

Referring firstly to FIG. 1 a side view of a single ground engaging seed delivery device is shown. In use, multiple gangs of such units would be assembled. The device can be seen to include an elongate support arm 8 which runs the substantial length of the device and serves as a mounting means for much of the componentry. The support arm 8 is pivotally mounted at 9 to a mounting means 7 by way of an intermediate dropper bar 6. The mounting means 7 takes the form of a parallel motion swinging bracket which is particularly adapted to accommodate vertical linear movement whilst ensuring verticality of the dropper bar during the whole action. In this manner the support arm 8 connected thereto likewise maintains its orientation to the ground during vertical movement of the mounting means in response to variations of the ground or soil as the device is drawn across the soil surface. Removed from the pivot region 9 at a first end of the arm is positioned a coulter disc 3, which may be offset at an appropriate angle and is adapted to form a furrow 10 in the ground as the device is drawn by a suitable driving means. The support arm is further provided with a back swept seed tube 2 for delivery of seed 12 into the furrow 10 formed by the coulter disc. The seed tube may include dual side skirts 14 which traverse either side of the outlet of the seed tube per se and act to stop the seed tube clogging with soil during delivery. The far or remote end of the support arm 8 is provided with a packer wheel 4 which is substantially aligned with the coulter disc and serves to replace and pack down the furrow formed by the coulter disc after delivery of seed through the seed tube 2. The packer wheel also provides a soil contour following means where an operative contour following point of reference is provided for the soil control mechanism. This allows the packer wheel to maintain a constant presentation of the soil control arm to the soil regardless of changes in soil contour. The device of the invention is further provided with a control arm 1 pivotally engaged at a first end to the support arm 8. The control arm is of elongate nature and adapted to traverse the coulter disc 3 and is provided at a second end with a foot 11 adapted to engage and carefully control the ground or soil displacement caused by said coulter disc. The positioning of the control arm and in particular the foot region thereof is adjacent the seed delivery tube and is adapted to cooperate with the near skirt region of the seed tube so as to retain the soil divot formed by the coulter disc in a gentle and controlled manner until the seed can be placed into the furrow. The particular function of the control arm is to ensure that the resulting divot created by the combined action of the coulter disc and the seed tube/skirt arrangement is prevented from falling in or away from the furrow before seed can be placed in the furrow. The foot engages the surface of the soil by a skiing action as it slides over the soil surface. The packer wheel then follows as the device is drawn over the soil to close the furrow and securely house the seed delivered into the furrow.

Figure 2:
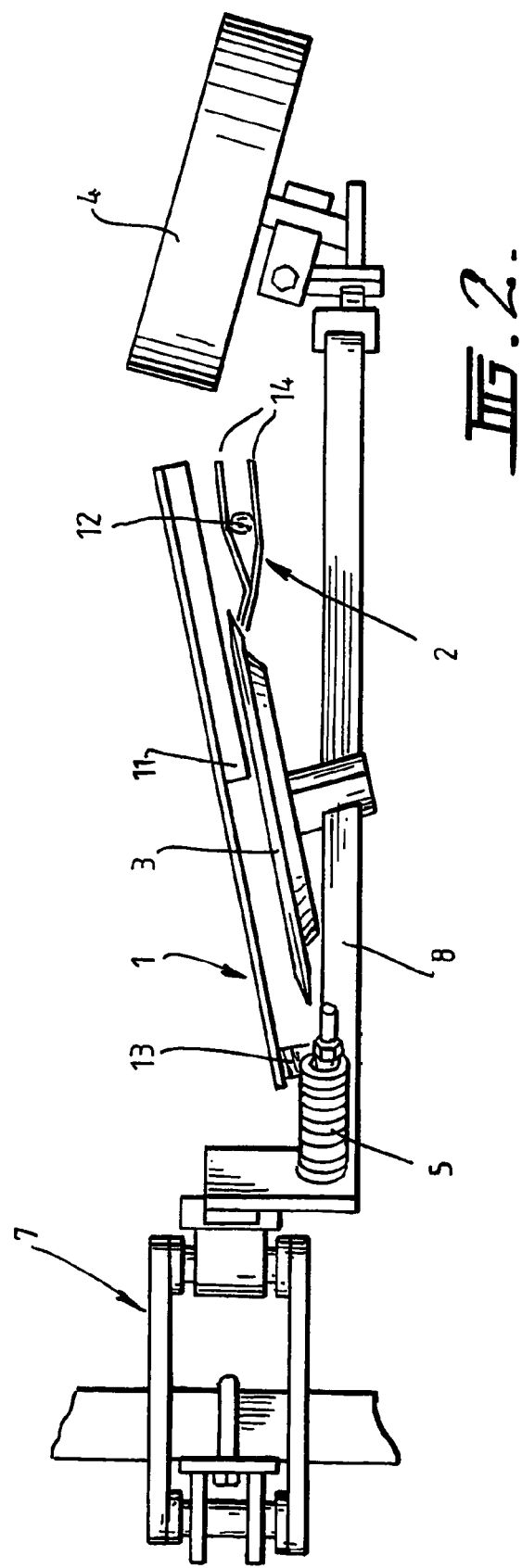
FIG. 2 shows a plan view of one seed delivery device.

Referring now to FIG. 2 a plan view of the device is shown which clearly indicates the orientation and positioning of the various components of the device. FIG. 2 particularly shows the position of the control arm 1 relative to the coulter disc 3 and the seed delivery tube 2 with the side skirts 14. The foot region 11 of the control arm 1 is so configured to cooperate with the coulter disc and side skirt of the seed delivery tube at ground level so as to ensure that the furrow formed by the coulter disc and seed tube skirt remains intact and receptive for delivery of seed via the delivery tube 2. The seed tube is most preferably positioned near the center of the coulter disc cut or furrow and between the coulter disc and packer wheels. Once the seed has been accurately and precisely delivered to the stabilised furrow the packer wheel 4 is then drawn over the open furrow so as to close the furrow down upon the buried seed 12 and thereby finish the sowing operation.

The support arm 8 is provided with a heavy biasing spring 5 so as to provide stump jump capacity for the support arm and associated componentry in the event that the device intercepts an obstacle during traversal of the ground. Failing such an encounter the lesser bias applied to the control arm 1 by way of the spring 13 and the mounting means 7 by way of the spring 16 ensure that the device and in particular the coulter disc, packer wheel and control arm remain snugly in touch with the soil during traversal thereof by the device. In addition to the above the spring steel dropper bar 6 acts as a buffer and shock absorber for the device and can provide sufficient compliance to allow for torsional twisting and movement encountered during operation without transmitting this to the operator or subjecting the device of the invention to potentially damaging strain and shocks.

The packer wheel is provided with various adjustable means such that it can be moved vertically in order to adjust the depth of furrow and may also be adjusted for trackability wherein the alignment of the packer wheel can be adjusted in terms of the direction and motion of the device per se so as to ensure that the furrow is most appropriately compacted.

The invention provides for the first time a seed delivery device able to open up a furrow in a controlled, precise and gentle manner whilst minimising loss of soil divot and/or undesirable compression of the soil. Once seed is deposited into the furrow the divot can be replaced in a precise manner thereby minimising any moisture loss and maximising seed positioning and seed soil contact at a precise soil depth.

In addition to the advantages of the invention in providing a highly accurate and precise seeding mechanism ensuring a high level of accuracy in terms of seed depth and faithful replacement and packing of the furrows so formed, the device of the invention also provides a self cleaning action of the coulter disc by coincidental cooperation with the control arm 1 and/or orientation of the packer wheel away from the direction of common travel of the device per se. The above described slicing and scrubbing action causes the resulting gently consolidated furrow to be gently rolled and folded back into position in contrast to the often compacting nature of soil build up with prior art devices utilizing wheel type soil control devices which can only contact soil about their respective center axis which leads to undesirable compression of the soil and soil moisture loss.

What is claimed is:

1. A ground engaging seed delivery device comprising an elongate support arm pivotally mounted to a driving means via a mounting means adapted to accommodate vertical linear displacement, wherein said support arm has an offset coulter disc fitted at a first end thereof followed by a back swept seed delivery tube and a packer wheel at the remote end thereof adapted to follow a soil contour such that said support arm will also follow said soil contour, wherein a soil control arm comprising an elongate arm and a ground engaging foot is positioned on said support arm to act between said coulter disc and packer wheel with at least part of said foot engaging the soil between said coulter disc and said packer wheel adjacent said seed delivery tube so that said soil control arm will follow a furrow formed by said coulter disc and prevent said furrow divot from either collapsing or being thrown into the furrow prior to delivery of seed into said furrow between said coulter disc and said packer wheel, such that said packer wheel can replace said divot immediately following delivery of seed to said furrow whilst allowing said soil control arm to maintain a constant presentation to said soil notwithstanding changes in soil contour, said control arm including a foot adapted to engage the ground adjacent said furrow from about the position of formation by said coulter disc to at least the position of said seed delivery tube.

2. A delivery device according to claim 1 wherein said control arm is biased in a downward vertical direction.

3. A delivery device according to claim 1 wherein said mounting means is a parallel motion swinging bracket such that the ground cooperating aspect of said coulter disc, control arm, seed delivery means and packer wheel are substantially maintained throughout said vertical displacement.

4. A delivery device according to claim 3 wherein said swinging bracket is biased in a downward vertical direction.

5. A delivery device according to claim 1 wherein said packer wheel is trackably adjustable to enable said packer wheel to run in a position other than the direction of travel of said device.

6. A delivery device according to claim 1 wherein said packer wheel can be adjusted vertically to determine the depth of furrow cut and seed delivery.

7. A delivery device according to claim 1 wherein said mounting means includes a spring steel dropper bar intermediate said support arm and said mounting means.

8. A ground engaging seed delivery device comprising an elongate support arm pivotally mounted to a driving means via a mounting means adapted to accommodate vertical linear displacement wherein said support arm has an offset coulter disc fitted at a first end thereof followed by a back swept seed delivery tube and a packer wheel at the remote end thereof adapted to follow a soil contour such that said support arm will also follow said soil contour wherein a soil control arm comprising an elongate arm and a ground engaging foot is positioned on said support arm to act between said coulter disc and packer wheel with at least part of said foot engaging the soil between said coulter disc and said packer wheel adjacent said seed delivery tube so that said soil control arm will follow a furrow formed by said coulter disc and prevent said furrow divot from either collapsing or being thrown into the furrow prior to delivery of seed into said furrow between said coulter disc and said packer wheel such that said packer wheel can replace said divot immediately following delivery of seed to said furrow whilst allowing said soil control arm to maintain a constant presentation to said soil notwithstanding changes in soil contour, said seed delivery tube including side skirts formed on either side of said tube which cooperate with the foot of said control arm to prevent said furrow divot from either collapsing or being thrown.

9. A delivery device according to claim 8 wherein said seed tube is positioned near the center of the coulter disc cut or furrow and between the coulter disc and packer wheel.

10. A ground engaging seed delivery device comprising an elongate support arm pivotally mounted to a driving means via a mounting means adapted to accommodate vertical linear displacement wherein said support arm has an offset coulter disc fitted at a first end thereof followed by a back swept seed delivery tube and a packer wheel at the remote end thereof adapted to follow a soil contour such that said support arm will also follow said soil contour wherein a soil control arm comprising an elongate arm and a ground engaging foot is positioned on said support arm to act between said coulter disc and packer wheel with at least part of said foot engaging the soil between said coulter disc and said packer wheel adjacent said seed delivery tube so that said soil control arm will follow a furrow formed by said coulter disc and prevent said furrow divot from either collapsing or being thrown into the furrow prior to delivery of seed into said furrow between said coulter disc and said packer wheel such that said packer wheel can replace said divot immediately following delivery of seed to said furrow whilst allowing said soil control arm to maintain a constant presentation to said soil notwithstanding changes in soil contour, said support arm being provided with a preloading bias to ensure substantially constant ground engagement of said coulter and packer wheels whilst allowing pivotal rotation to accommodate stump jumping.

11. A delivery device according to claim 10 wherein said preload bias is greater than said control arm bias or said swinging bracket bias.

* * * * *